Sept. 8, 1931.  H. MARLES  1,822,053
ROLLER BEARING
Filed May 14, 1928
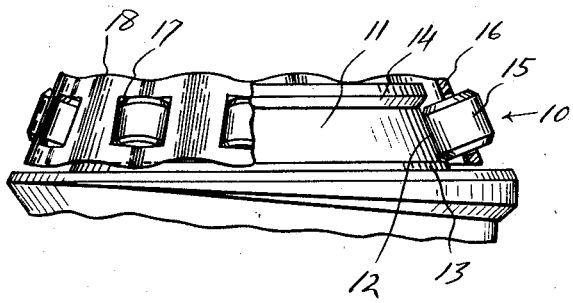
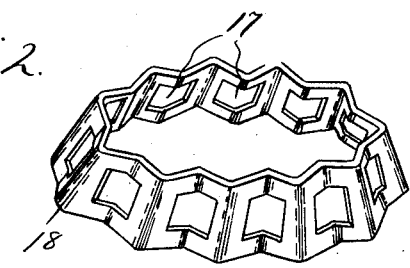
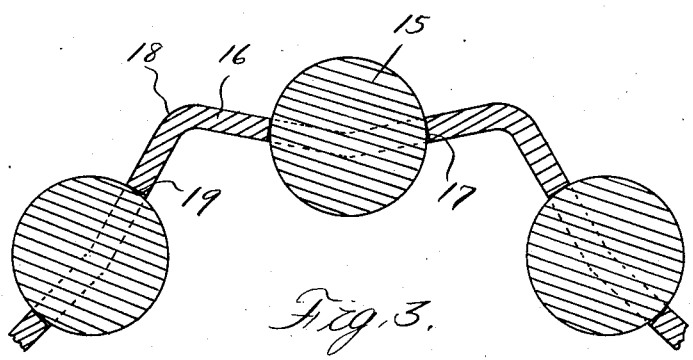
Inventor
Henry Marles Patented Sept. 8, 1931

1,822,053

UNITED STATES PATENT OFFICE

HENRY MARLES, OF DETROIT, MICHIGAN, ASSIGNOR TO GEMMER MANUFACTURING COMPANY, OF DETROIT, MICHIGAN, A CORPORATION OF MICHIGAN

ROLLER BEARING

Application filed May 14, 1928. Serial No. 277,778.

This invention relates generally to roller bearings and refers particularly to a novel form of cage construction for such bearings.

In the past it has been the custom to provide roller bearings with cages having pockets for receiving the rollers but these cages have either been provided with struck out portions projecting from the pockets for engaging the cylindrical surfaces of the rollers, or have been so formed as to present sharp edge portions contacting with the rollers. Furthermore in the type of cages having the struck out portions, the same must be formed of a metal sufficiently thin to permit striking out of the metal.

The object of the present invention is to provide a cage in which no struck out portions are utilized and which can therefore be formed of comparatively thick metal. The metal used, however can be easily crimped and this crimping not only makes the cage sufficiently resilient to permit of a certain expansion for slipping the cage into place upon an inner bearing member, but it also functions to present the sides of the pockets tangentially to the cylindrical surfaces of the rollers, the metal being of a thickness to make the aforesaid sides sufficiently flat to comprise excellent bearing surfaces.

Another advantage gained by the crimping operation is that the perimeter of each pocket is smaller on the exterior than on the interior of the cage and this arrangement permits the rollers to project through the pockets sufficiently to provide outer bearing surfaces and at the same time securely retains the same in operative position.

With the above and other objects in view the invention consists in certain novel features of construction, combinations and arrangements of parts as will be more fully described and particularly pointed out in the appended claims.

In the drawings:

Figure 1 is a view of the assembled bearing.

Figure 2 is a perspective view of the cage.

Figure 3 is an enlarged fragmentary view of a portion of the cage showing a roller positioned in one of the pockets.

Referring now to the drawings the numeral 10 designates a roller bearing comprising an inner bearing member 11 having a conical bearing surface 12, a shoulder 13 at the base of the conical surface and an annular ridge 14 at the top of this surface. A plurality of rollers 15 are adapted to be positioned about the conical surface 12 and are retained in operative position by means of a conical cage 16. This cage is formed with a plurality of spaced openings 17 having ribs 18 positioned between adjacent openings, the openings 17 constituting pockets for receiving the rollers 15.

After the pockets are formed therein, the cage is preferably crimped inwardly from the center of each rib 18 to form the completed cage shown in the drawings. This crimping serves to press the opposite sides of each pocket inwardly out of the same common plane whereby they present flat faces 19 tangentially to the cylindrical surfaces of the rollers as clearly disclosed in Figure 3. The crimping action also functions to make the outer perimeter of each pocket smaller than the inner perimeter and the rollers are constructed of a size which will permit the same to project a substantial distance through the pockets without allowing them to slip entirely therethrough.

In assembling the bearing, the rollers are first placed in the pockets of the cage and then the cage is pressed upon the bearing member 11 until the smaller end thereof has been sprung over the ridge 14, the crimping imparting sufficient resiliency to the cage to permit expansion thereof for this purpose.

From the foregoing it will be apparent that I have provided a roller bearing having a cage of simple construction so designed as to not only retain the rollers in operative position but to provide bearing surfaces therefor, sufficient for the efficient operation of the bearing.

What I claim as my invention is:

1. A roller bearing cage comprising an annular shell having spaced openings constituting roller receiving pockets and with the edges thereof perpendicular to the outer and inner surfaces, said shell being crimped to arrange said edges in converging relation to each other and in tangential relation to the cylindrical surfaces of the rollers.

2. A roller bearing cage comprising an annular shell having spaced openings therein constituting roller receiving pockets with the edges thereof perpendicular to the outer and inner surfaces and with rib portions between adjacent pockets, said shell being crimped inwardly from the center line of each rib to arrange the edge portions of said pockets in converging relation to each other and in tangential relation to the cylindrical surfaces of the rollers.

3. A roller bearing cage comprising an annular shell having spaced roller receiving pockets therein with the opposite edges thereof perpendicular to the outer and inner surfaces of the shell, the imperforate portions of the shell at opposite ends of said pockets being of a length equal to the diameter of the roller and being crimped to arrange said edge portions of the pocket in converging relation to each other and in tangential relation to the cylindrical surface of the roller, said crimping contracting the width of said pocket to less than the diameter of the roller.

4. A roller bearing cage comprising a conical shell having spaced openings constituting roller receiving pockets with the edges thereof perpendicular to the surfaces of the cone, the thickness of said shell being sufficient to provide a substantial width to said edge portions, said shell being crimped to arrange said edge portions of the pockets in converging relation to each other and in tangential relation to the cylindrical surface of the roller and also contracting the width of the pocket to less than the diameter of the roller.

In testimony whereof I affix my signature.

HENRY MARLES.